(12) United States Patent
Lee

(10) Patent No.: US 6,528,922 B2
(45) Date of Patent: Mar. 4, 2003

(54) MOTOR HOUSING HAVING SIMPLIFIED COVER PLATE AND BRUSH BASE

(75) Inventor: Keung Lee, Shatin (HK)

(73) Assignee: New Bright Industrial Co., Ltd., Kowloon (HK)

( * ) Notice: Subject to any disclaimer, the term of this patent is extended or adjusted under 35 U.S.C. 154(b) by 0 days.

(21) Appl. No.: 09/909,995

(22) Filed: Jul. 23, 2001

(65) Prior Publication Data

US 2002/0047468 A1 Apr. 25, 2002

Related U.S. Application Data

(60) Provisional application No. 60/238,019, filed on Oct. 6, 2000.

(51) Int. Cl.[7] .............................................. H02K 13/00
(52) U.S. Cl. ......................................... 310/239; 318/89
(58) Field of Search ................................. 310/239, 238, 310/90, 89

(56) References Cited

U.S. PATENT DOCUMENTS

| | | | |
|---|---|---|---|
| 3,445,692 A | | 5/1969 | Kato |
| 3,584,248 A | * | 6/1971 | Higashimo .................... 310/68 |
| 3,654,504 A | * | 4/1972 | Susdorf ....................... 310/239 |
| 4,037,316 A | | 7/1977 | Stoll |
| 4,041,339 A | | 8/1977 | Huber et al. |
| 4,127,785 A | * | 11/1978 | Noguchi ....................... 310/89 |
| 4,152,614 A | | 5/1979 | Noguchi et al. |
| 4,177,396 A | | 12/1979 | Wang |
| 4,293,789 A | | 10/1981 | King |
| 4,315,237 A | | 2/1982 | Middleman et al. |
| 4,728,835 A | | 3/1988 | Baines |
| 4,746,829 A | | 5/1988 | Strobl |
| 4,795,079 A | | 1/1989 | Yamada |
| 4,801,833 A | | 1/1989 | Dye |
| 4,853,576 A | * | 8/1989 | Mayumi ....................... 310/239 |
| 5,010,264 A | | 4/1991 | Yamada et al. |
| 5,089,801 A | | 2/1992 | Chan et al. |
| 5,140,205 A | | 8/1992 | Baines |
| 5,294,851 A | | 3/1994 | Tajima et al. |
| 5,294,852 A | | 3/1994 | Straker |
| 5,434,460 A | | 7/1995 | Mabuchi et al. |
| 5,598,045 A | | 1/1997 | Ohtake et al. |
| 5,600,193 A | | 2/1997 | Matsushima et al. |
| 5,620,311 A | * | 4/1997 | Wetzel ......................... 417/415 |
| 5,633,542 A | | 5/1997 | Yuhi et al. |

OTHER PUBLICATIONS

Physical sample—1 sheet of pictures of Mabuchi Miniature Motor (photos of actual motors shown and discussed at interview).

Physical sample—1 sheet of pictures of Johnson Electric Miniature Motor (photos of actual motors shown and discussed at interview).

* cited by examiner

Primary Examiner—Nestor Ramirez
Assistant Examiner—Nguyen Hanh
(74) Attorney, Agent, or Firm—Nixon & Vanderhye P.C.

(57) ABSTRACT

An end assembly for a miniature motor. The end assembly including a brush base, a pair of brush arms supporting brushes, and a cover plate supporting a rotor bearing. The end assembly fits into an open end of a cylindrical motor housing.

10 Claims, 5 Drawing Sheets

MOTOR HOUSING HAVING SIMPLIFIED COVER PLATE AND BRUSH BASE

CROSS-REFERENCES TO RELATED APPLICATIONS

This application claims the benefit of Provisional Application No. 60/238,019, filed Oct. 6, 2000, the entire content of which is hereby incorporated by reference in this application.

FIELD OF THE INVENTION

The invention relates generally to miniature motors used in, for example, toys; audio and video equipment, and automotive electrical appliances, hand tools and other motor-driven devices. More particularly, the invention relates to an end cover plate and brush base for a motor casing of a miniature motor.

BACKGROUND OF THE INVENTION AND RELATED ART STATEMENT

FIG. 1 is a miniature motor 10 having a metallic cylindrical housing 12. The housing 12 may be formed of mild steel and have a hollow tubular section 14 and an integral bottom 16. The opposite end 30 of the housing is open to receive a brush base and cover plate at one end of the tubular section. Within the housing are fixed a pair of opposite permanent magnets 18, each of which have an arc shape to match the inner wall of the housing. The magnets form between them a volume in the housing for a rotor 20. The rotor includes a cylindrical armature 22 coaxially mounted on a rotor shaft 24. The rotor shaft 24 extends through the opposite ends of the housing 12.

Bearings 26 are mounted to rotatably support the shaft in the ends of the housing. The bottom 16 of the motor housing has an integral flange 28, into which is press-fitted a bearing 26 to support one end of the rotor shaft 24. The opposite end 30 of the housing has an open cylindrical base which receives a brush base 32 and cover plate 34 which are assembled together to fit in the open end 30 of the housing.

The cover plate 34 fits over the base, and the cover plate and brush base fit into the motor housing. The open edge of the housing is crimped onto the plate. The cover plate 34 has a flange 36 to support a bearing 26 which supports an end of the rotor shaft 24. The flange 36 and bearing 26 of the cover plate 34 (when inserted in the motor housing) are coaxially aligned with the flange 28 and bearing 26 on the bottom section 16 of the motor housing so that the rotor shaft is held in coaxial alignment with the motor housing 12.

The brush base 32 supports a pair of brush arms 38 which provide an electrical connection between an external electrical contact 40 of the motor and the armature 22 of the rotor 20. The brush arms are generally strips of copper having a first end fixed to the periphery of the brush base 32 and an opposite, free end on which is mounted a brush 42. The brush arms are attached to opposite sides of the brush base. The brushes on the arms face each other at the axis of the motor. When inserted in the housing, the brushes are in slidable contact with the commutator 44 on the rotor shaft 24. The commutator provides an electrical contact between the wiring of the armature 22 and the brushes.

The external contacts 40 of the brush arms provide direct electrical current (D.C.) through the brushes and the commutator to the windings in the armature 22. Electrical current flowing through the armature creates an alternating magnetic field within the housing that interacts with the magnetic field of the permanent magnets 18. This interaction of magnetic fields creates a force that rotates the rotor 20. This rotation drives the rotor shaft 24 to provide a mechanical rotational output power source from the rotor. The rotor shaft 24 extends through the bottom 16 of the housing to provide a mechanical power output to drive a gear box or other device.

Conventional cover plates 34 are cylindrical discs having embedded recesses which fit into matching slots in the brush base 32 and/or grooves in the end 30 of the housing. Forming a motor plate having recesses, brush bases having slots and machining the motor housing to have the grooves needed to match the cover plate and/or base adds to the complexity and cost of miniature motors. Miniature motors tend to be a relatively-low cost component of toys and other equipment. Accordingly, it is important that manufacturing costs for making these motors be minimized.

SUMMARY OF THE INVENTION

The invention is intended to overcome the problems inherent with prior miniature motors having complicated brush bases, and motor plates. Specifically, the invention relates to a simplified construction of a motor housing, brush base and motor plate.

The simplified construction features include a motor housing having an outer end which has a smooth circular edge, that does not require the cutting of slots into the edge. Minimal machining may be applied to the edge to polish an outer ring of the housing and to machine a lip to engage the brush base. The brush base also has a simplified construction and formed by injection molded plastic. Moreover, the brush base has several features which facilitate the assembly of the motor housing including a collar and flange that fit easily into the motor housing to fix the position of the brush base inside the housing. The cover plate, which may be a simple metal stamp construction, fits directly onto a planar region of the brush base.

DETAILED DESCRIPTION OF THE INVENTION

Figure 1:
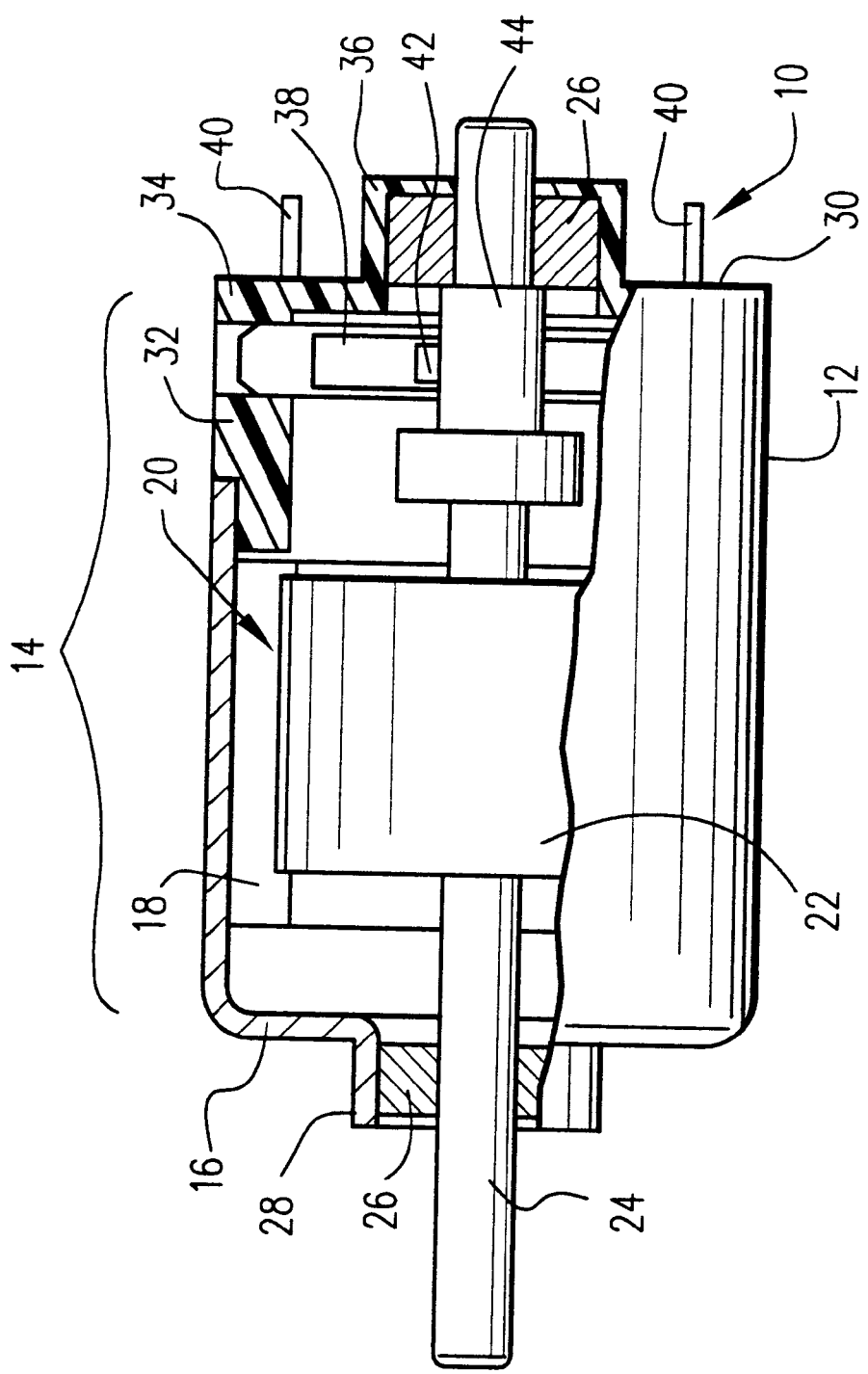
FIG. 1 is a partial cross-sectional side view illustrating an example of a conventional miniature motor.
Figure 2:
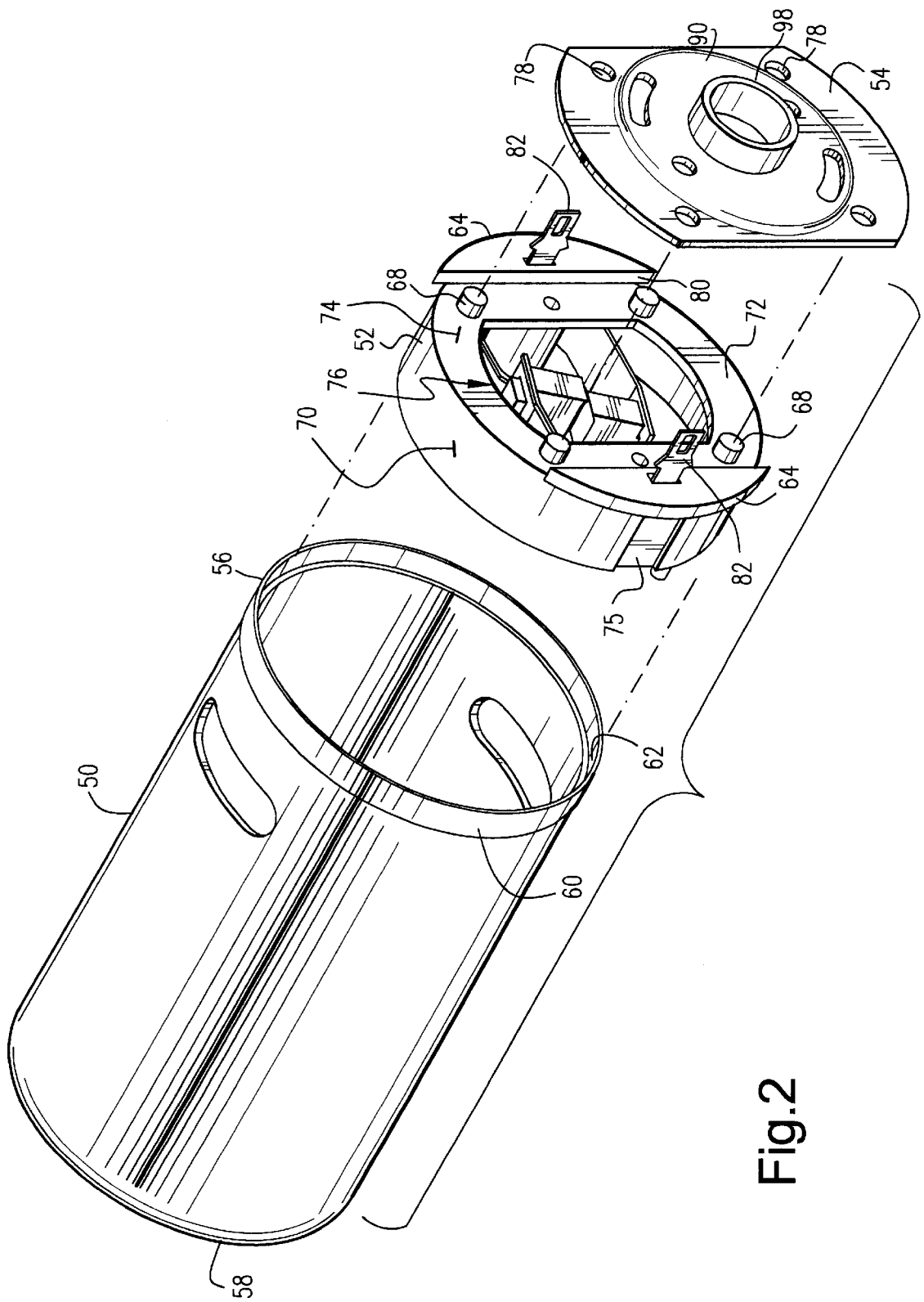
FIG. 2 is an exploded view of a motor casing, brush base and motor plate.

FIG. 2 shows an exploded view of a motor housing 50, a brush base 52 and a motor cover plate 54. The housing 50 is a cylindrical metallic steel shell having an open end 56 and a closed bottom end 58. An advantage of the motor housing 50 is that the open end 56 has a smooth circular edge which is easily fabricated and does not require specialized machining to form grooves, slots or other shapes in the edge. By eliminating the grooves, slots or other shapes at the edge, the circular edge of the end 56 is a smooth surface, with good roundness. The outer surface of the housing may be formed at ring 60, which extends approximately 0.25 inch from the outer edge 56 of the housing.

The inside surface of the housing includes an annular lip 62, which engages a pair of flange sections 64 of the brush base. The annular lip is a ring on the inside surface of the housing, adjacent to the edge 56, and having a diameter slightly greater than the inside diameter of the housing. The ring may have a rounded shoulder at the transition between the ring and the rest of the inside surface (having a smaller diameter) of the tubular housing. A rounded shoulder may provide a better grip on the flange 64 of the base holder, which is entirely in a plane normal to the axis of the housing. The formation of a smooth and continuous edge 56 of the housing having an outer polished ring 60, and an inner lip 62 with good roundness is relatively simple and inexpensive.

Figure 3:
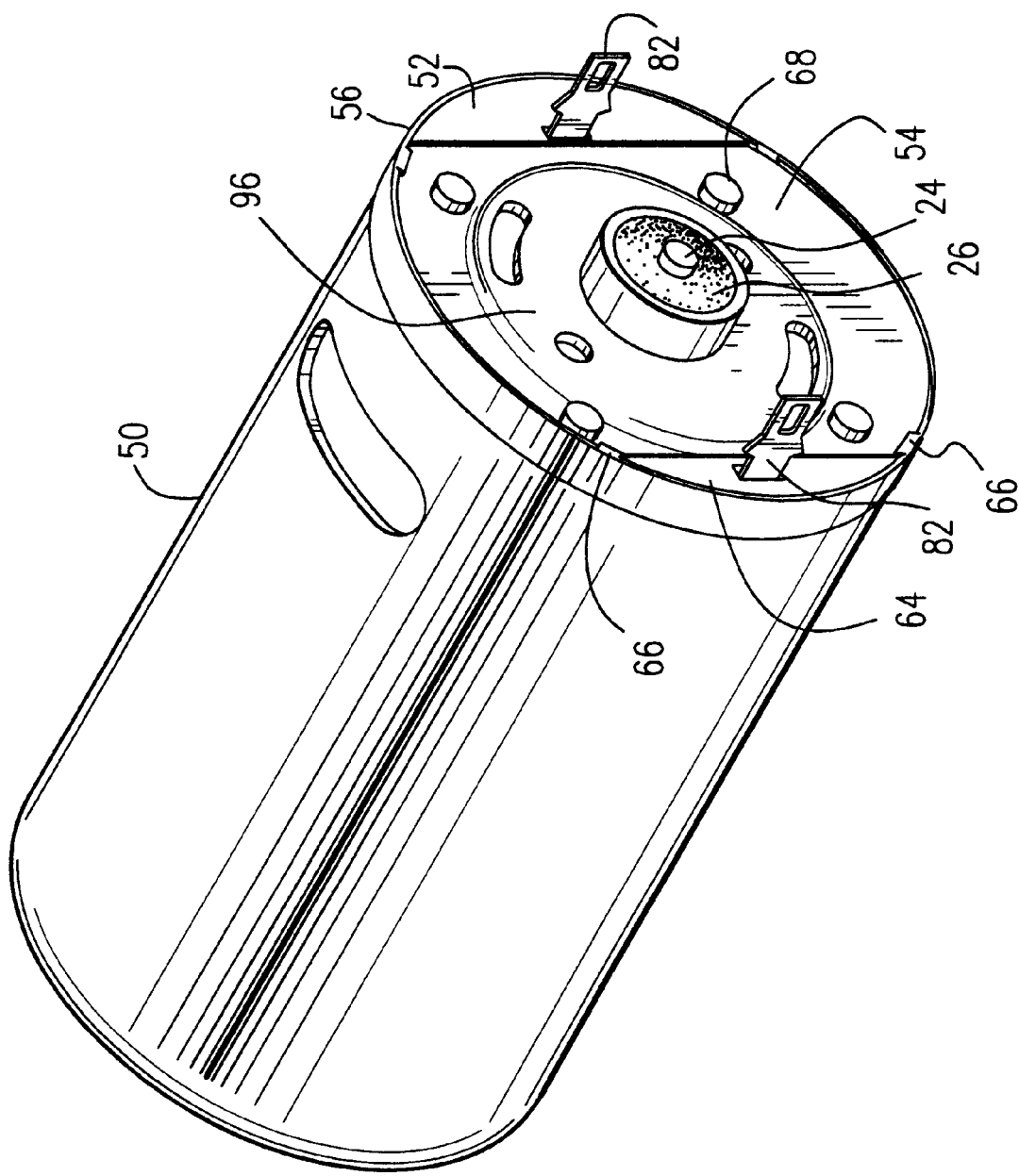
FIG. 3 is an end view of a motor casing assembled with a brush base and motor plate.

FIG. 3 shows the brush base 52 and motor cover plate 54 inserted in the open end 56 of the housing. The brush base and cover plate are coaxially aligned with the housing. To secure the brush base in the housing, a crimping tool (not shown) makes small indentations 66 on the outer edge 56 of the casing. These indentations bend inward to the edge 56 of the housing to fix the brush base 52 and cover plate 54 to the housing. The indentations 66 in the housing edge 56 are aligned with the base and the cover plate to hold both the base and plate in the housing, and to locate the relative position between the brush base and housing without any rotation. The outer diameter of the brush base 52 slides inside the inside diameter (beyond the lip 62) of the housing 50 by way of an interference fit. The flanges 64 of the base slide in the housing until they engage the lip 62. The lip has a diameter slightly larger, e.g., by one or more tenths of an inch, than the inside diameter of the housing. The flange and lip engagement prevents the brush base from sliding further into the housing. The engagement of the flanges 64 and lip 62, and the crimping 66 of the edge of the housing onto the brush base and cover plate, the brush base is held securely within the motor casing 50.

Figure 4:
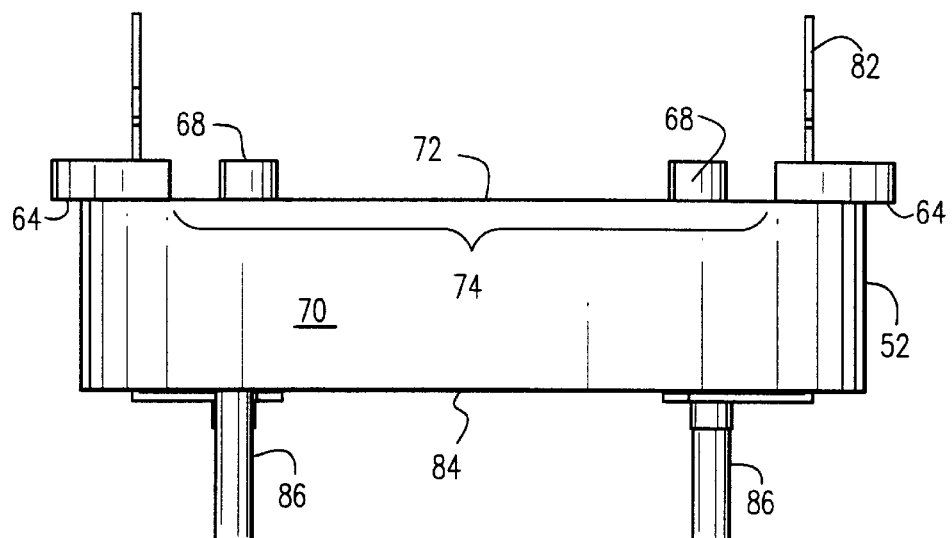
FIG. 4 is a side view of the brush base shown in FIG. 2.

FIG. 4 shows a side view of the brush base 52. The base includes an annular collar 70 that has an outside diameter substantially the same as the inside diameter (below the lip 62) of the housing 50. The outside of the brush base may include at least one vertical slot 75. The brush base is formed of a plastic material having relatively high rigidity and strength, and a large dielectric constant to provide electrical insulation. The collar may include a pair of opposite vertical slots 73 to receive a grounding element to the housing when assembled. The slot may extend substantially the height of the collar, except for the flange 64 continues across the slot. These slots 73 may not be necessary for some motors. The outer end 72 of the base 52 includes a recessed center planar section 74 that provides a platform on which the cover plate 54 lies. The planar region 74 has a semi-rectangular opening (76 in FIG. 5) to provide open access through which extends the rotor shaft. To assist with attaching the motor plate 54 to the brush base 52, the planar region 74 includes small posts 68 which fit into matching apertures 78 in the cover plate. The plate is fitted onto the planar region 64 and snapped onto the posts 68. To secure the plate, the outer tips of the posts 68 may be press fit to form a rivet-type connection holding the plate onto the brush base.

The outside end 72 of the brush base also includes a pair of opposite plateau-flanges 64 that are slightly elevated above the planar region. Each plateau-flange has an inner straight edge 80 that borders the cover plate, and an outer arc-shaped edge that slightly overhangs the collar 70 of the brush base, e.g., by about a tenth of an inch. The overhang of the flange abuts against the lip 62 of the housing, when the base is inserted in the housing. Thus, the overhang should extend beyond the collar by approximately the same distance as the width of the lip in the housing. The flanges are each a relatively thick portion of the base and include slots through which extend the electrical contacts 82 for the motor.

The inside end 84 of the brush base 52 slides into the housing. A pair of magnet posts 86 extend downward from the end 84 of the base and abut against the permanent magnets 18 fixed to the inside wall of the motor housing. These posts 86 insure that the permanent magnets and the brush base remain properly separated in the motor housing.

Figure 5:
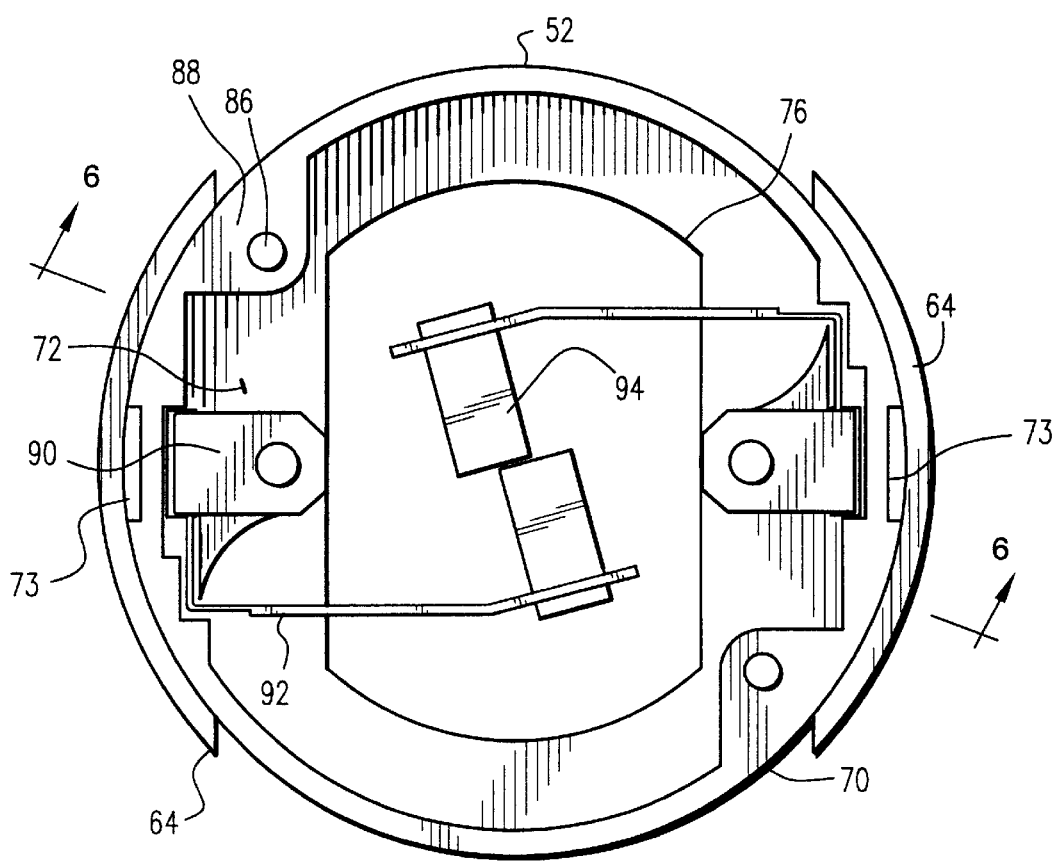
FIG. 5 is an inside end view of a brush base.
Figure 6:
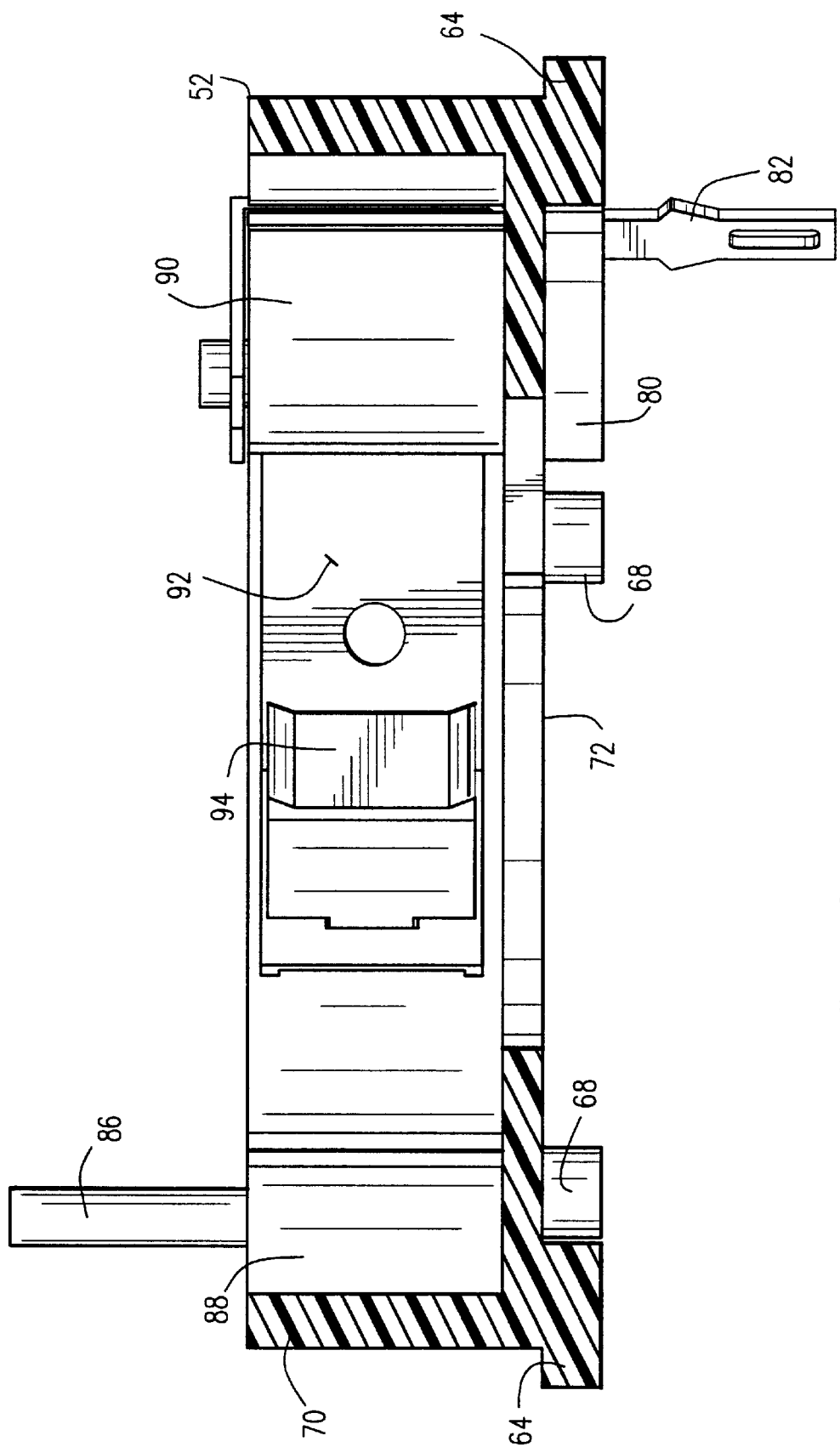
FIG. 6 is a cross-sectional diagram of the brush base shown along section line 6—6 in FIG. 5.

FIG. 5 shows a bottom view of the brush base 52 and FIG. 6 shows a cross-sectional view of the brush base through section line 6—6. To provide structural support for the magnet post 86, a pair of post supports 88 are formed in the brush base integral with the collar 70. Similarly, an arm support 90 is integrally formed with the collar and provides a support for a pair of the brush arms 92. The arm base 90 includes slots to receive the end of the brush arm, and to provide an electrical connection with the external connector 82.

Each brush arm 92 is formed of a highly conductive metal, such as copper, and extends from the base 52 towards the center of the brush base. The arm may have a shallow U cross-sectional shape to provide structural rigidity to the arm. At the free end of each arm (towards the center of the motor) is attached a conductive brush 94. The arm forms a cantilevered beam that holds the brush and biases against the commutator. The brushes are rotatably and slidably in contact with the commutator of the motor and provide the electrical connection between the rotor and the external power contacts.

The brush base 52 is an integral plastic component that is injection molded. The external connectors 82, brush arms 92 and brushes 94 are fastened to the brush base 52 to form a complete component ready for assembly in the motor. The cover plate 54 is a flat metallic plate easily formed. As shown in FIG. 3, the plate has a semi-rectangular outer shape, including a pair of opposite straight edges which are in abutting contact with the flanges 64 of the base. The other pair of edges of the plate are arc-shaped to match the curvature of the open end 56 of the motor housing. The plate also includes a center circular plate 96 that is slightly raised to provide structural support for the bearing flange 98. This flange supports the rotor bearing 26 and the rotor shaft 24.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A motor comprising:
    a cylindrical housing having an open end with a circular edge and a lip on an inside surface of the housing;
    a brush base having an annular collar which fits into the open end of the housing and past the lip, an outside end of the collar includes a recessed planar region defined by a pair of opposed plates, wherein the plates rise above the annular collar and overhang a periphery of the collar such that the plates abut the lip when the base is inserted in the housing to position the brush base in the housing, and
    a cover plate sized to fit on said planar region of the brush base, said cover plate having an annular flange to support a rotor bearing.

2. A motor as in claim 1, wherein said brush base further includes a pair of brush arms supporting brushes.

3. A motor as in claim 2, wherein the brush base further includes external connectors attached to the brush arms, extending through the base and protruding outwardly from the outside end of the collar.

4. A motor as in claim 1, wherein the brush base is formed of plastic and the cover plate is metal.

5. A motor as in claim 1, wherein the planar area has posts which insert into apertures of the cover plate, and the posts are permanently press fit to secure the cover plate.

6. A motor as in claim 1, wherein the annular collar has a circular cross section.

7. A motor as in claim 6 wherein the collar has an outer peripheral surface form a substantially uninterrupted annular surface.

8. A motor as in claim 7, wherein said outer peripheral surface of the collar is interrupted by a pair of narrow vertical slots in the surface.

9. A motor as in claim 1, wherein the cover plate is a semi-rectangular plate having a raised disk with the annular flange.

10. A motor as in claim 1, wherein the circular edge of the cylindrical housing includes crimping to hold the cover plate on the brush base.

* * * * *